P., J. AND A. L. POMÉON.
MOLDING PRESS.
APPLICATION FILED DEC. 26, 1919.

1,388,889.

Patented Aug. 30, 1921.

UNITED STATES PATENT OFFICE.

PIERRE POMÉON, JOSEPH POMÉON, AND ANTOINE LEON POMÉON, OF ST. CHAMOND, FRANCE.

MOLDING-PRESS.

1,388,889.  Specification of Letters Patent.  Patented Aug. 30, 1921.

Application filed December 26, 1919. Serial No. 347,416.

*To all whom it may concern:*

Be it known that we, PIERRE POMÉON, JOSEPH POMÉON, and ANTOINE LEON POMÉON, citizens of the French Republic, of St. Chamond, Loire, France, have invented certain new and useful Improvements in Molding-Presses, of which the following is a specification.

This invention relates to apparatus for molding boxes and other hollow articles having ribs or beads formed thereon or therein, the material used being cardboard or other material capable of being shaped for the purpose required.

The invention is illustrated in the accompanying drawing, which shows a press for molding a circular cardboard box having two circular external ribs, one at the bottom and one about half-way between the bottom and the rim.

Figure 1:
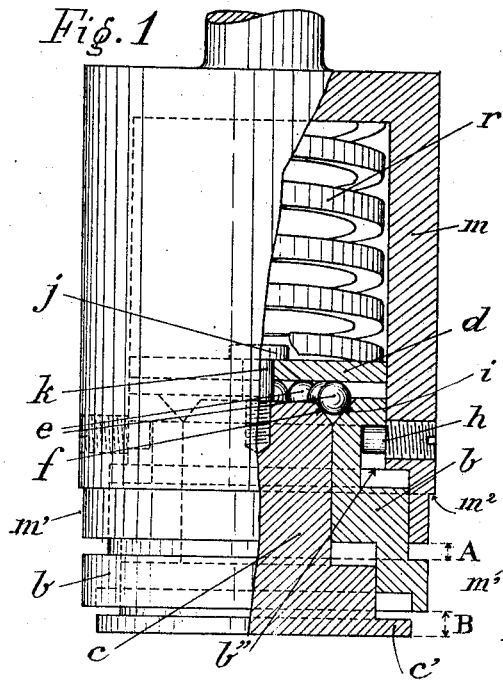

Figure 1 is an elevation of the mandrel, partly in section.

Figure 2:
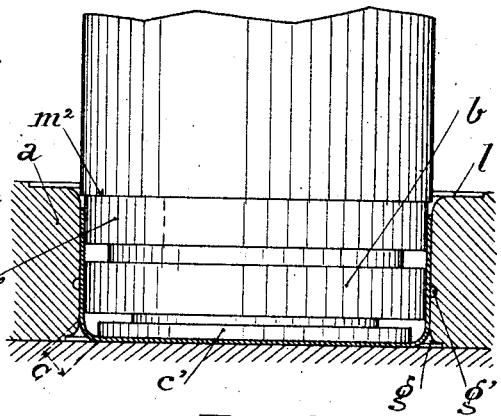
Figures 3, 6:
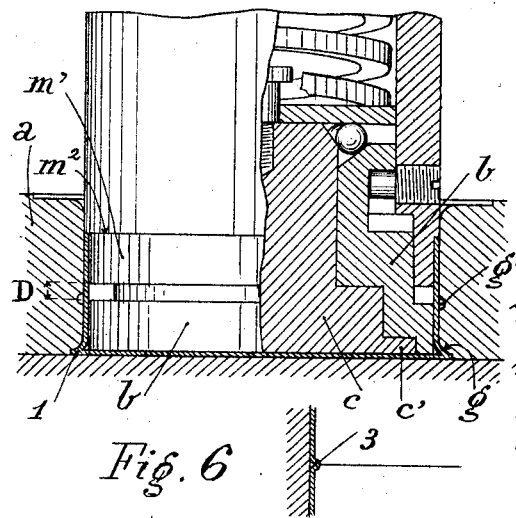
Figures 4, 5:
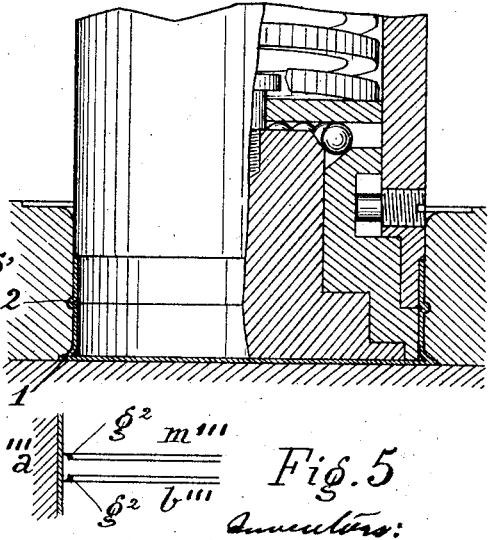

Figs. 2, 3, and 4 show the lower part of the mandrel in the matrix, at different stages of the operation, these views being likewise partly in section.

Figs. 5 and 6 illustrate a modification for producing an internal rib.

In the drawing, $a$ designates the matrix or die, and $m$ a hollow body or shell of a plunger, which partly incloses two concentric piston-like plunger elements $b$ and $c$, projecting from the orifice of said shell, the part $c$ being within the part $b$ and having limited independent movement. Both these plunger elements $b$ and $c$ are thrust downward by a strong coiled spring $r$ within the part $m$, the said spring bearing against a plate $d$ which rests upon a ring of balls $e$ seated in a V-shaped channel formed by converging bevels $i$ and $f$ of the parts $b$ and $c$. The downward movement of the part $b$ in the part $m$ is limited by studs or stops $h$ screwed into the part $m$ and projecting into a cavity $b^{11}$ in the part $b$. The downward movement of the part $c$ is limited by a screw $k$ screwed into the top of this part, with the smooth part of its shank passing through the plate $d$ and its head $j$ forming a stop over the said plate.

The part $c$ is stepped, and the interior of the part $b$ is likewise stepped, to fit thereon in the manner shown in Figs. 3 and 4. Externally the lower part of the shell $m$ is slightly turned down to make a constriction $m^1$ whose diameter is equal to the internal diameter of the box, the shoulder $m^2$ being equal to the thickness of the cardboard.

Below this constriction $m^1$ the protruding part of the plunger element $b$ has an enlargement $b^1$ of the same diameter as the constriction. When the parts $m^1$ and $b^1$ meet, as shown in Fig. 4, their combined height is equal to the height of the box wall, measured from the upper surface of the box floor, and the joint between them is at the level of the upper rib. Below the part $b^1$ the plunger element $c$ has a foot $c^1$ of such diameter that it can enter the cavity at the bottom of the part $b^1$.

It will be seen that the shell $m$ and parts $b$ and $c$ form in conjunction a telescopic plunger. When the parts $b$ and $c$ are thrust out of the shell by the spring $r$ to the fullest extent allowed by the stops $h$ and $j$, as shown in Fig. 1, there is a gap A between the parts $m^1$ and $b^1$, and a gap B between the part $b^1$ and the lower edge of the part $c^1$.

The matrix or die $a$ has a cylindrical cavity, with two circular grooves or channels $g$ and $g^1$ formed in the wall thereof. A shallow depresion $l$ is formed around the rim of this cavity.

For making a cardboard box a disk of cardboard is laid upon the matrix, with its rim in the depression $l$, and the plunger, in the extended state shown in Fig. 1, is brought down upon this disk and forced into the matrix swaging or molding the blank with the shape of a cylindrical box in the manner shown in Fig. 2. The spring $r$ is sufficiently powerful to keep the parts $b$ and $c$ extended until the foot $c^1$ has thrust the blank against the floor of the matrix. The downward movement of the part $c$ being then arrested, the continued downward thrust exerted on the plunger causes the plate $d$, bearing on the balls $e$, to push down the part $b$ over the part $c$, and the shoulder $m^2$, acting on the rim of the box, push the box wall downward, so that the rounded part C (Fig. 2) joining the wall to the bottom of the box is forced or extruded into the groove $g$ and forms a rib 1, as shown in Fig. 3. At this stage the downward movement of the part $b$ is arrested, but the shell $m$ continues to descend until it meets the part $b^1$, and by this means the part D (Fig. 3) of the box wall is forced or extruded into the groove $g^1$, to form a rib 2, as shown in Fig. 4.

The plunger is then withdrawn from the matrix, and the latter, which is made in two parts with a hinge, in the usual manner, is opened to enable the box to be taken out.

It will be obvious that by providing additional plunger elements in series, with gaps such as the gap A in Fig. 1, and using a matrix or die with additional grooves, a hollow article having any desired number of ribs can be made.

To produce an internal rib, as shown at 3 in Fig. 6, by means of a plunger operating in the same manner, the wall of the matrix is left smooth, as shown at $a^{111}$ in Fig. 5, but the rims of two consecutive plunger elements $m^{111}$ and $b^{111}$ are beveled, as shown at $g^2$, so that when these two elements meet they will leave a circular cavity into which a portion of the blank is forced, to form the rib. This arrangement may be used in conjunction with an arrangement such as shown in Figs. 1 to 4, so that a hollow article is produced having both internal and external ribs.

What we claim as our invention and desire to secure by Letters Patent of the United States is:—

1. In a molding or swaging press the combination of a matrix, and a plunger adapted to enter said matrix, the said plunger comprising a shell having an orifice, a piston-like member which is guided in said shell and has an enlargement outside said orifice, and elastic means in said shell acting to maintain said piston in projected relation to said shell with a gap between said enlargement and the rim of said orifice, and permitting said enlargement to be forced toward said rim during the pressing operation, for the purpose specified.

2. In a molding or swaging press, the combination of a grooved matrix and a telescopic plunger adapted to enter said matrix, said plunger and matrix forming in conjunction a mold having a wall parallel with the plunger movement, and said plunger having a shoulder which closes said mold, the said plunger comprising a shell, two members axially and independently slidable in said shell, one within the other, said slidable members having converging beveled edges within said shell forming in conjunction a channel, balls disposed in said channel, a plate resting on said balls, a spring bearing on said plate tending to thrust said slidable members out of said shell, and means limiting the outward movement of each of said slidable members allowing one of said members to issue farther than the other, for the purpose specified.

In witness whereof we have signed this specification in the presence of two witnesses.

PIERRE POMÉON.
JOSEPH POMÉON.
ANTOINE LEON POMÉON.

Witnesses:
  CARADIST,
  MONTEBRA.